(12) United States Patent
Fornara et al.

(10) Patent No.: US 9,034,088 B2
(45) Date of Patent: May 19, 2015

(54) INKS FOR INKJET PRINTERS

(75) Inventors: Dario Fornara, Novara (IT); Alan Nappa, Modena (IT); Tamara Verzotti, Bellinzago (IT); Paolo Prampolini, Castelnuovo Rangone (IT); Stefano Crespi, Busto Arsizio (IT); Giovanni Floridi, Novara (IT); Giuseppe Li Bassi, Gavirate (IT)

(73) Assignee: LAMBERTI SPA, Albizzate (IT)

( * ) Notice: Subject to any disclaimer, the term of this patent is extended or adjusted under 35 U.S.C. 154(b) by 59 days.

(21) Appl. No.: 13/992,639

(22) PCT Filed: Dec. 5, 2011

(86) PCT No.: PCT/EP2011/071693
§ 371 (c)(1),
(2), (4) Date: Jun. 7, 2013

(87) PCT Pub. No.: WO2012/076438
PCT Pub. Date: Jun. 14, 2012

(65) Prior Publication Data
US 2013/0271525 A1  Oct. 17, 2013

(30) Foreign Application Priority Data
Dec. 9, 2010  (IT) .............................. VA2010A0092

(51) Int. Cl.
*C09D 11/02*  (2014.01)
*C09D 11/322*  (2014.01)
*B41M 5/00*  (2006.01)
*C09D 11/326*  (2014.01)

(52) U.S. Cl.
CPC ........... *C09D 11/322* (2013.01); *B41M 5/0047* (2013.01); *B41M 5/007* (2013.01); *B41M 5/0088* (2013.01); *C09D 11/326* (2013.01)

(58) Field of Classification Search
CPC .............................. C09D 11/30; C09D 11/322
USPC .................................. 106/31.6, 31.65, 31.75
See application file for complete search history.

(56) References Cited

U.S. PATENT DOCUMENTS

| 4,224,212 A | 9/1980 | Topham |
| 4,861,380 A | 8/1989 | Campbell et al. |
| 6,197,877 B1 | 3/2001 | Thetford et al. |
| 7,008,988 B2 | 3/2006 | Thetford et al. |

FOREIGN PATENT DOCUMENTS

| EP | 1840178 A1 | 10/2007 |
| EP | 2159269 A1 | 3/2010 |

*Primary Examiner* — Veronica F Faison
(74) *Attorney, Agent, or Firm* — Mossman, Kumar & Tyler PC

(57) ABSTRACT

Method for decorating green or fired ceramic bodies by inkjet printing comprising the use of a ceramic inkjet ink which is prepared by milling a ceramic inorganic pigment in an organic medium in the presence of a dispersant which is the reaction product of a polyethyleneimine and a ricinoleic acid polyester, until the average particle size of the pigment is between 0.1 and 0.8 μm.

12 Claims, No Drawings

INKS FOR INKJET PRINTERS

FIELD OF THE INVENTION

The present invention relates to ceramic inkjet inks and to a method for decorating green or fired ceramic bodies by the use of inkjet printing.

The ceramic inkjet inks of the invention comprises ceramic inorganic pigments having average particle size between 0.1 and 0.8 µm dispersed in an organic medium and a dispersant which is the reaction product of a polyethyleneimine and a ricinoleic acid polyester.

BACKGROUND OF THE ART

Most traditional ceramic manufactured products, such as wall tiles and floor tiles, are made of a ceramic body that confers form and mechanical properties to the object; the ceramic body generally has some porosity and poor aesthetic qualities.

Said ceramic body, which is defined "green" or, alternatively, "fired", if previously fired, is then usually coated with a ceramic layer, called ceramic glaze; the ceramic glaze is completely sintered by firing, in such a way to gain suitable superficial aesthetic qualities and, in the meantime, to become a fluid-proof barrier; as a matter of fact, after firing, the ceramic glaze has usually no porosity and is generally resistant to abrasion and to the attack of chemical agents such as acids, bases, dyes.

The aesthetic finishing of the ceramic material can be completed by a decoration phase, that is by the application of sinterable and variously coloured ceramic materials (ceramic pigments) which are applied according to a precise drawing (décor).

The decor can be applied either on the green or fired ceramic body, on which the glaze was previously set, or, in the so called third firing decorations, after the firing, on the glaze.

Different techniques are used to transfer images to the ceramic substrate: i.e. screen printing and photogravure (commonly referred to as rotocolor). These technologies require flat substrate or with minimum roughness, they are suitable for mass production, but have very limited flexibility of new design set up and changeover between designs.

Another technique of printing decoration on ceramics is digital printing by inkjet technique.

Digital printing and decoration by inkjet technique is widely used in multiple sectors, such as graphic arts, textile industry, industrial marking and it is well known, both referring to printing equipments and also to the inks used.

Peculiarly in ceramic applications, the thermal treatment, which is required once the substrate has been printed, makes the conventional inks, that are used in the other applications and are mainly based on organic pigments, unsuitable for use.

Two kind of inks for inkjet printing of ceramics are known: inks constituted by solutions of metallic cations and inks based on dispersions of inorganic pigments.

When inks based on dispersions of inorganic pigments are concerned, it is mandatory that the inorganic pigments are well dispersed in the liquid medium and possess nano-scale dimensions, for the ceramic inkjet ink flows through small nozzles (30-100 µm in diameter) at high speed.

Nano-scale dimensions of the inorganic pigments are usually obtained by milling with microspheres the pigments, pre-dispersed in the medium, in the presence of a milling aid.

Examples of ceramic inkjet inks based on dispersions of inorganic pigments in polar organic mediums are described in EP 2159269, WO 2006/126189, EP 1840178; the inks are generically said to contain antisettling and/or dispersing agents.

Nonetheless, there is still the industrial need for improved ceramic inkjet inks based on inorganic ceramic pigments having low viscosity, solid particle size below 0.8 µm, long shelf life and that can be printed on ceramic surfaces and passed through a high temperature kiln to form a permanently glazed print.

It has now been found that the reaction product of a polyethyleneimine and a ricinoleic acid polyester can conveniently be used in the preparation of ceramic inkjet inks for inkjet printing machines.

Surprisingly, the reaction product of a polyethyleneimine and a ricinoleic acid polyester, is perfectly suitable, in the milling phase, to fluidize the pre-dispersed inorganic pigments allowing their rapid milling and to subsequently prevent agglomeration and sedimentation of the nano-scale inorganic pigments in the final ink.

The reaction product of a polyethyleneimine and a ricinoleic acid polyester is a known product that belongs to a wide class of dispersants obtained from the amidation and/or salification of polyamines and carboxyl terminated polyesters, which have been described in many patents; by way of example we cite: U.S. Pat. No. 4,224,212, U.S. Pat. No. 4,861,380, U.S. Pat. No. 5,700,395 and U.S. Pat. No. 6,197,877.

Such wide class of dispersants is generally suitable for use as dispersing agents for various solids in organic liquids.

The reaction product of a polyethyleneimine and a ricinoleic acid polyester, in particular, has been described in U.S. Pat. No. 4,224,212 as a dispersing agent for paints and conventional inks and in U.S. Pat. No. 7,008,988 as a dispersing agent for paints and paints mill-bases comprising a film-forming binder resin.

Nonetheless, none of the above cited documents suggests that the reaction product of a polyethyleneimine and a ricinoleic acid polyester may be suitable as adjuvant for nano-scale applications, such as for the preparation and stabilization of inkjet inks for ceramic.

SUMMARY OF THE INVENTION

In one aspect, the invention is a composition for ceramic inkjet inks comprising a ceramic inorganic pigment, an organic medium and a dispersant which is the reaction product of a polyethyleneimine and a ricinoleic acid polyester, wherein said ceramic inorganic pigment has average particle size between 0.1 and 0.8 µm.

In another aspect, the invention is a method for decorating green or fired ceramic bodies by inkjet printing that comprises the following steps:

i. a ceramic inkjet ink comprising a ceramic inorganic pigment having average particle size between 0.1 and 0.8 µm is prepared by milling an inorganic pigment having initial average particle size between 1.0 and 10.0 µm in an organic medium in the presence of a dispersant which is the reaction product of a polyethyleneimine and a ricinoleic acid polyester;

ii. a glaze is spread on the surface of the green or fired ceramic body;

iii. the decoration is made by means of inkjet printing, by using one or more ceramic inkjet inks according to point i.;

iv. the obtained substrate is fired at a temperature comprised between 900 and 1250° C. for 15-240 minutes.

DETAILED DESCRIPTION OF THE INVENTION

The inorganic pigment of the ceramic inkjet ink of the present invention shall exhibit an average particle size ($d_{50}$) of less than 0.8 µm and preferably from 0.1 to 0.5 µm, most preferably from 0.1 to 0.3 µm, as measured by laser diffraction particle size analysis according to ISO standard 13320-2009.

The average particle size, i.e. the average equivalent diameter, is the diameter where 50 percent by weight of the particles have a larger equivalent diameter, and the other 50 percent by weight have a smaller equivalent diameter.

Any of the recognized classes of pigments used in ceramic decoration (ceramic pigments) may be used as the inorganic pigment, such as, for example, zirconates and silicates of Cr, Sn, Ni, Pr, Fe, Co and oxides thereof, and preferably those ceramic pigments selected from ZrPr, ZrPrSi, Zr—Fe—Si, Ti—Cr—Sb, Co—Al—Zn, ZrVaSi, FeCrCoNi, CrCaSnSi, CoSi, and FeCrZn.

The organic medium present in the ceramic inkjet ink is preferably a polar organic medium or a substantially non-polar aliphatic or aromatic hydrocarbon or halogenated hydrocarbon, including mixtures thereof.

For example, suitable polar media are selected from one of glycol ethers or glycol ether esters exhibiting a flash point in excess of 75° C., such as polypropylene glycol, tripropylene glycol monomethyl ether (TPM), tripropylene glycol butyl ether (TPB), butyl glycol ether acetate.

Examples of suitable non-polar media are long chain aliphatic solvents such as isoparaffins, commercially available as ISOPAR products from ExxonMobil Chemical and the corresponding products from BP and Total, dearomatised aliphatic hydrocarbons, commercially available as EXXSOL from ExxonMobil Chemical and the corresponding products from Total, 2-isopropylnaphthalene and 2,6-diisopropylnaphthalene.

The preferred organic mediums are tripropylene glycol monomethyl ether and tripropylene glycol butyl ether.

The dispersant, which is the reaction product of a polyethyleneimine and a ricinoleic acid polyester, is obtained from the amidation and/or salification of a linear or branched polyethyleneamine with a ricinoleic acid polyester.

Branched polyethyleneimines of differing molecular weight are commercially available, by way of example from BASF (under the trade name Lupasol®) and Nippon Shokubai (under the trade name Epomin®).

Linear polyethyleneimines can be prepared by hydrolysis of poly (N-acyl) alkyleneimines as described by Takeo Saegusa et al in Macromolecules, 1972, Vol. 5, page 4470.

The polyethyleneimine is preferably branched and has a weight average molecular weight from 100 to 600,000, more preferably from 1,000 to 200,000, even more preferably from 1,000 to 100,000 and especially from 1,000 to 70,000.

The determination of the weight average molecular weight of the polyethyleneimine is familiar to the skilled person and takes place by the method of size exclusion chromatography, using a light scattering detector, as for example by means of an Agilent 1100 differential refractometer with Agilent 1100 VWD UV photometer and a Wyatt Dawn EOS light scattering detector.

The ricinoleic acid polyester may be prepared by polymerization of ricinoleic acid at temperature between 150 and 180° C., as described to for example in U.S. Pat. No. 4,224,212; in the preparation of the polyester it is preferred to include an esterification catalyst such as a tin salt of an organic acid, for example dibutyl tin dilaurate, a tetra-alkyl titanate, for example tetrabutyltitanate, a zinc salt of an organic acid, for example zinc acetate, a zirconium salt of an aliphatic alcohol, for example zirconium isopropoxide, toluene sulphonic acid or a strong organic acid such as a halo acetic acid, for example trifluoro acetic acid.

The ricinoleic acid polyester may also include monomers from other $C_6$-$C_{18}$ hydroxycarboxylic acids or lactones, such as 12-hydroxydodecanoic acid, 5-hydroxydodecanoic acid, 5-hydroxydecanoic acid, 4-hydroxydecanoic acid, ε-caprolactone and especially 12-hydroxystearic acid; in case that other monomers are present, the polyester may be random or block, and the molar ratio of ricinoleic acid and other monomeric acids is not less than 2:1, more preferably not less than 4:1 and especially not less than 10:1. In the preferred embodiment the ricinoleic acid polyester is a ricinoleic acid homopolymer.

The ricinoleic acid polyester shall be carboxyl terminated, and may be initiated with an organic carboxylic acid that can be aromatic, heterocyclic, alicyclic or preferably aliphatic and is optionally substituted by halogen, $C_{1-4}$-alkoxy or hydroxy groups. Preferably, the organic carboxylic acid is unsubstituted. When the organic carboxylic acid is aliphatic, it may be linear or branched, saturated or unsaturated, but is preferably saturated. The total number of carbon atoms in the initiating organic carboxylic acid can be as high as 50, but it is preferred that it contains not less than 8, more preferably not less than 12 and especially not less than 14 carbon atoms. It is also preferred that the organic carboxylic acid contains not greater than 30, more preferably not greater than 25 and especially not greater than 20 carbon atoms.

Particularly useful effects have been obtained with ricinoleic acid polyesters having molecular weight between 800 and 2,000 and polyethyleneimine having a weight average molecular weight of from 1,000 to 70,000.

The molecular weight of the ricinoleic acid polyesters is determined from their acid value (or "neutralization number" or "acid number" or "acidity"), which is the mass of potassium hydroxide (KOH) in milligrams that is required to neutralize one gram of polyester, as it is well known in the field.

The dispersant of the invention is obtained by reacting the polyethyleneimine and the above described ricinoleic acid polyester at temperature between 50 and 250° C. and preferably in an inert atmosphere. Preferably, the temperature is not less than 80° C. and especially not less than 100° C. and not greater than 150° C.

The weight ratio of ricinoleic acid polyester to polyethyleneimine is preferably from 1 to 100.

At least two moles of polyester shall be attached to each mole of polyethylenimine.

The viscosity of the ceramic inkjet ink is between 5 and 50 mPa*s, and preferably between 8 and 30 mPa*s.

The ceramic inkjet ink typically contains from 5 to 60% by weight of the pigment, the precise quantity depending on the nature of the pigment and on the relative densities of the pigment and the organic medium. Preferably the dispersion contains from 15 to 45% by weight of the pigment.

The content of organic medium is from 30 to 80% by weight based on the total weight of the ink, preferably from 45 to 80% by weight. The content of the dispersant in the ink is between 2 and 15% by weight based on the total weight of the ink, preferably from 4 to 10% by weight.

The ceramic inkjet ink of the invention is prepared by milling a commercial ceramic inorganic pigment having average particle size between 1.0 and 10.0 µm, in the presence of the organic medium and the reaction product of a polyethyleneimine and a ricinoleic acid polyester.

The pigment, the organic medium and the reaction product of a polyethyleneimine and a ricinoleic acid polyester may be mixed in any order, the mixture then being subjected to a mechanical treatment to reduce the particles of the pigment to an appropriate size by milling with milling beads having diameters from 0.1 to 0.5 mm.

When the pigment is milled, the temperature is preferably not greater than 45° C.

The invention is further illustrated by the following examples wherein all references are to parts by weight unless expressed to the contrary.

EXAMPLES

Preparation of Dispersant A

A mixture of 300 parts of ricinoleic acid and 0.6 parts of dibutyl tin dilaurate was stirred, under nitrogen, and heated at 180° C. for 10 hours removing the esterification water.

The product was an oil liquid with an acid value of 50 mg KOH/g (Polyester 1).

19.6 parts of Lupasol PR 8515 (polyethylenimine from BASF having MW 2,000) and 250 parts of Polyester 1 were stirred, under nitrogen, and heated to 120° C. for 2 hours.

The dispersant was obtained as a viscous liquid.

Preparation of Dispersant C (Comparative)

A mixture of 300 parts of 12-hydroxystearic acid and 0.6 parts of p-toluenesulphonic acid was stirred, under nitrogen, and heated at 180° C. for 10 hours removing the esterification water. The product was a soft paste with an acid value of 52 mg KOH/g (Polyester 2). 8,9 g of tetraethylenepentamine and 71.1 parts of Polyester 2 were stirred, under nitrogen, and heated to 180° C. for two hours. The dispersant was obtained as a hard wax.

Preparation of the Ceramic Inkjet Inks

Three ceramic inkjet inks were prepared, by using in each a different dispersant (Dispersant A, Dispersant C, Emulson AG/TRS 204, which is a polyethoxylated polyaryl sulfate ester from Lamberti SpA).

7.8 g of dispersant are stirred and dissolved it in 89.7 g of Dowanol TPM in 5 minutes.

52.5 g of blue pigment of cobalt silicoaluminate are added and mixed for 5 minutes.

The blue pigment has $d_{50}$=2.0 μm, measured by particle Size

Analysis (Malvern Instruments Mastersizer 2000).

200 g of grinding media (YTZ® Grinding Media 0.3 mm, made of Yttrium Stabilized Zirconia Grinding Beads, produced by Nikkato Corporation) and 60 g of the mixture prepared as described above are charged in a 125 ml grinding jar made from zirconium oxide and milled in a planetary ball mill (PM 200 produced by Retsch).

The dispersants performances were evaluated by measuring their solubility in different organic mediums, the milling time (time needed to mill the pigment to $d_{50}$ from 0.20 to 0.40 μm), the stability of the corresponding ceramic inkjet ink.

Solubility was determined at 20° C. at 5% by weight in tripropylene glycol butyl ether (TPB) and Exxsol® D140 (dearomatised hydrocarbon fluid from ExxonMobil Chemical) after stirring with a magnetic stirrer for 5 minutes and after storing at rest at 20° C. for 24 hours and for 7 days.

The results are reported in Table 1

TABLE 1

| | | Solubility | | |
|---|---|---|---|---|
| Dispersant | Medium | After 5' | After 24 h | After 7 days |
| Dispersant A | TPB | complete | complete | complete |
| | Exxsol D140 | complete | complete | complete |

The milling time and corresponding d50 are reported in Table 2. Particle size analysis has been performed by using a Malvern Instruments Mastersizer 2000.

TABLE 2

| | Milling time | |
|---|---|---|
| Dispersant in the ink | Milling time (hours) | $d_{50}$ (μm) |
| Dispersant A | 2 | 0.22 |
| Dispersant C | >4 | >1.0 |
| Emulson AG/TRS 204 | 3 | 0.34 |

Stability was determined by storing the ceramic inkjet inks at 60° C. for 5 days and 12 days and by visually checking the homogeneity of the samples (H) or the separation of liquid phases (S) and/or sedimentation (SS).

The results are reported in Table 3.

TABLE 3

| | Stability | |
|---|---|---|
| Dispersant in the ink | Stability after 5 days | Stability after 12 days |
| Dispersant A | H | H |
| Emulson AG/TRS 204 | S | S + SS |

The invention claimed is:

1. A ceramic inkjet ink comprising:
    a ceramic inorganic pigment,
    an organic medium and
    a dispersant which is the reaction product of a polyethyleneimine and a ricinoleic acid polyester,
wherein the ceramic inorganic pigment has an average particle size from 0.1 to 0.8 μm.

2. The ceramic inkjet ink of claim 1 wherein the ceramic inorganic pigment has an average particle size from 0.1 to 0.5 μm.

3. The ceramic inkjet ink of claim 1 wherein the dispersant is obtained from the amidation and/or salification of a linear or branched polyethyleneamine with a ricinoleic acid polyester.

4. The ceramic inkjet ink of claim 3 wherein the ricinoleic acid polyester is a ricinoleic acid homopolymer.

5. The ceramic inkjet ink of claim 3 wherein the ricinoleic acid polyester has a molecular weight of from about 800 to about 2,000.

6. The ceramic inkjet ink of claim 3 wherein the polyethyleneimine has a weight average molecular weight of from about 1,000 to about 70,000.

7. The ceramic inkjet ink of claim 5 wherein the weight ratio of ricinoleic acid polyester to polyethyleneimine is from about 1 to about 100.

8. The ceramic inkjet ink according to claim 3 wherein the ricinoleic acid polyester includes monomers from $C_6$-$C_{18}$ hydroxycarboxylic acids or lactones that are different from ricinoleic acid, and the molar ratio of ricinoleic acid and other $C_6$-$C_{18}$ hydroxycarboxylic acids is at least 2:1.

9. The ceramic inkjet ink of claim 8, wherein the molar ratio of ricinoleic acid and other $C_6$-$C_{18}$ hydroxycarboxylic acids is at least 10:1.

10. The ceramic inkjet ink of claim 1 wherein:
   the ceramic pigment is present at a concentration of from about 5 to about 60% by weight of the ceramic inkjet ink;
   the organic medium is present at a concentration of from about 30 to about 80% by weight of the ceramic inkjet ink; and
   the dispersant is present at a concentration of from about 2 to about 15% by weight of the ceramic inkjet ink.

11. A method for decorating green or fired ceramic bodies by inkjet printing comprising:
   preparing a ceramic inkjet ink of claim 1 by milling a ceramic inorganic pigment having an average particle size between 1.0 and 10 μm in an organic medium in the presence of a dispersant which is the reaction product of a polyethyleneimine and a ricinoleic acid polyester, until the average particle size of the pigment is between 0.1 and 0.8 μm;
   spreading a glaze on the surface of the green or fired ceramic body;
   inkjet printing the decoration by using at least one of the ceramic inkjet inks to produce a decorated substrate; and
   firing the decorated substrate at a temperature of from about 900 to about 1250° C. for from about 15 to about 240 minutes.

12. A method for decorating green or fired ceramic bodies by inkjet printing comprising:
   preparing a ceramic inkjet ink of claim 10 by milling a ceramic inorganic pigment having an average particle size between 1.0 and 10 μm in an organic medium in the presence of a dispersant which is the reaction product of a polyethyleneimine and a ricinoleic acid polyester, until the average particle size of the pigment is between 0.1 and 0.8 μm;
   spreading a glaze on the surface of the green or fired ceramic body;
   inkjet printing the decoration by using at least one of the ceramic inkjet inks to produce a decorated substrate; and
   firing the decorated substrate at a temperature of from about 900 to about 1250° C. for from about 15 to about 240 minutes.

* * * * *